United States Patent

Senior

[11] 3,919,433
[45] Nov. 11, 1975

[54] PROCESS FOR RECOVERING LIVESTOCK FOOD FROM CATTLE EXCRETA WASTE

[75] Inventor: Franklin C. Senior, Phoenix, Ariz.

[73] Assignee: Feed Recycling Co., Brawley, Calif.

[22] Filed: June 14, 1974

[21] Appl. No.: 479,192

[52] U.S. Cl. ............ 426/320; 260/112 R; 260/122; 426/495; 426/807

[51] Int. Cl.² ........................................ A23K 1/18

[58] Field of Search .......... 426/478, 495, 481, 373, 426/374, 320, 807, 431, 364, 212; 71/21, 22; 210/2, 53, 18, 52; 260/112 R, 122

[56] References Cited

UNITED STATES PATENTS

| 970,711 | 9/1910 | Hoskins | 71/21 |
|---|---|---|---|
| 2,204,703 | 6/1940 | Sanders | 260/112 R |
| 3,545,977 | 12/1970 | Stahler | 426/495 X |
| 3,550,524 | 12/1970 | Brumagim | 99/470 |
| 3,637,643 | 1/1972 | Wingerd | 260/122 |
| 3,645,893 | 2/1972 | Rohrer | 210/52 X |

FOREIGN PATENTS OR APPLICATIONS

| 86,751 | 3/1971 | Germany | 426/807 |

OTHER PUBLICATIONS

Water Treatment Handbook, Degremont, 1973, Taylor & Carlisle, pp. 111-113, 560-561.

*Primary Examiner*—S. Leon Bashore
*Assistant Examiner*—Kenneth M. Schor
*Attorney, Agent, or Firm*—George J. Netter, Esq.

[57] ABSTRACT

A cattle excreta waste and recycle brine solution slurry first has ash components removed, following which it is separated in a perforate basket centrifuge separator rotated at a prescribed speed with a part of the flocculating agents added, whereby a floc cake is formed in the separator which also serves to remove fine suspended proteins, fats and the like from the liquid portion of the slurry. The damp cake is sterilized and dried to form the recycled feed. The liquid from the separator is transferred to a settling tank, with solids being removed therefrom and separated via a solid bowl centrifuge. Liquid supernate from the tank and the centrate liquid from the centrifuge are recycled in the process, with a portion of the clear sterile supernate being disposed of to a salt flat or evaporator. The solids from the centrifuge, after suitable drying, are also used as recycled livestock feed.

3 Claims, 1 Drawing Figure

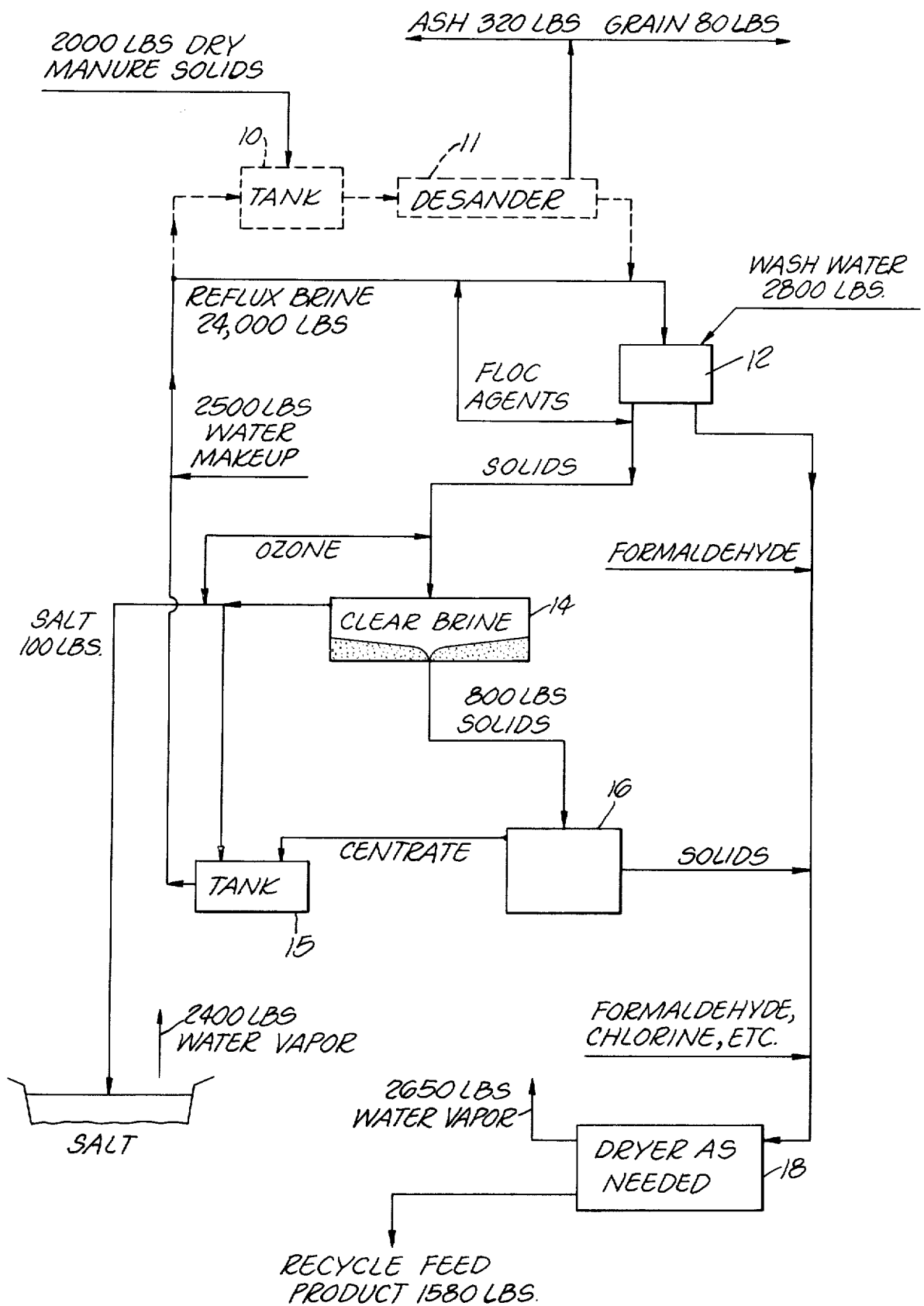

3,919,433

PROCESS FOR RECOVERING LIVESTOCK FOOD FROM CATTLE EXCRETA WASTE

The present invention relates broadly to a process and system for recovering livestock food from cattle excreta waste, and, more particularly, to an improved process and system for recovering proteins, proteinaceous materials, fats, sugars and starches, from cattle excreta waste.

BACKGROUND OF THE INVENTION

It is conventional practice in the raising of cattle in many countries to confine them in so-called feedlots or feedyards, where they are fed high-value feed mixes enriched with proteins, carbohydrates, fats, vitamins and minerals for the purpose of achieving a rapid gain in weight of the cattle prior to their being slaughtered for food. Such feedyards may, not infrequently, contain as high as 50,000 head of cattle which are confined within a relatively small area. In a conventional feed yard, the cattle excreta waste includes solid waste eliminated from the alimentary canal together with excreted urine.

Studies have shown that cattle, as compared to fish or poultry, for example, are relatively inefficient in converting food, and particularly high-value feed mixes, to meat and tissue. In fact, it has been demonstrated that a daily average of 18 pounds by dry weight of typical high-value feed mixes must be fed to each animal for its maintenance and to produce a daily average increase in weight of 2½ to 2¾ pounds. Furthermore, an average animal voids approximately 6 to 8 pounds by dry weight in a 24 hour period, so that 30 to 40 percent by weight of the food value passes through the animal and is present in its manure.

Copending U.S. patent application, Ser. No. 339,892, PROCESS FOR RECOVERING NUTRIENTS FROM CATTLE MANURE, by Franklin C. Senior, filed Mar. 9, 1973, and assigned to the same assignee, discloses a process for recovering nutrients from manure in which protein constituents are flocculated from a manure-water slurry, the floc being filtered and then dried to form an edible protein cake. As an initial step, the slurry is centrifuged to separate the liquid content generally from the solids, with the solid and liquid portions being separately treated. The liquid portion is treated by autoclaving, settling and a further centrifugation separation, after which the remaining liquid portion is evaporated to provide further protein cake.

In another copending application, Ser. No. 420,398, PROCESS AND APPARATUS FOR REMOVING ASH AND INORGANIC COMPOUNDS FROM CATTLE MANURE, by Franklin C. Senior, filed Nov. 30, 1973, also assigned to the same assignee, the water-manure slurry, prior to nutrient recovery, is specifically treated to remove the so-called ash components, e.g., inorganic salts, earth oxides and the like, which in other known processes has been merely ignored. Ash components are not only present to a certain extent in the feed mix itself, but also make their way into the manure from other sources, and particularly from earthen floors of feedyards. The kind and variety of the ash components can vary considerably and it is desirable that they be removed, since where there is repeated recycling of animal feed, these components could build up to a level which might be dangerous to the health of the cattle. According to the invention of this copending application, ash components are removed from the slurry stream by depositing the slurry onto a slanting, reverse run riffle belt, a vibrating table, or other such device. The ash components are removed along with a small amount of fibers, feed mix, kernels, grains and other organic matter, while the remainder of the manure slurry to be processed is conveyed off the lower end.

SUMMARY OF THE INVENTION

Briefly, in accordance with the practice of the process of this invention, a system is provided in which cattle excreta waste slurry first has ash components removed as in the referenced copending application. The slurry less ash components is then treated in a suitable Tolhurst perforate basket centrifuge (30–48 inch diameter) rotated at a prescribed speed with flocculating agents added, whereby a floc cake is formed in the centrifuge which also serves to remove fine suspended proteins, fats and the like from the liquid portion of the slurry. The damp cake is sterilized and dried to form the recycled feed.

The liquid from the separator is transferred to a settling or thickening tank and flocculating agents added, with solids being removed therefrom and separated via a solid bowl centrifuge (e.g., 48 inch diameter Tolhurst). The liquid supernate from the thickening tank and the centrate liquid from the centrifuge are refluxed in the process, with a portion of the clear sterile supernate being disposed of to a salt flat or evaporator. The solids from the centrifuge, after suitable drying, are also used as recycled feed.

DESCRIPTION OF THE DRAWING

FIG. 1 of the drawings is a schematic flow diagram of the process of this invention for extracting livestock food from cattle excreta waste manure.

DESCRIPTION OF A PREFERRED EMBODIMENT

It has been determined that an average ton of dry excreta waste from an earthen floor feed or dairy lot contains about 65 percent by weight of organic and other nutrients. The destruction of organic nutrients by bacteriological action begins almost immediately and can be shown to be directly related to time and moisture content. Of course, such action is accelerated markedly in wet and warm climates. The manure sample on which the described example of the present invention was based consisted of a 2,000 pound dry sample of manure obtained from an earthen floor feedlot, which sample was two to three months old. This manure was found to contain by weight approximately 20 percent proteins and fats, 45 percent fibrous starches, sugars, cellulose and lignins, with the balance being soluble and insoluble ash.

As an initial step in the process of this invention, the manure is converted to a manure-water slurry, which experience has shown to preferably be accomplished by providing 12 to 14 parts of water or brine (the latter being recirculated in the process) to obtain an effective separation of the unwanted insoluble solid ash component and the gross fibers from the liquid content. In the case of confined yard excreta wastes, they normally have one part solids to 5.6 to 6.0 parts water at the time voided, and this must also be diluted to the preferred proportions given in order to obtain effective separation. For a more complete understanding of the process of this invention, it is important to note that protein and fat globules in a manure slurry are found in a very fine (micron sized) dispersion and, although in the precise physical sense of the word are insoluble in the water stream, may, from a practical standpoint, be considered to be dispersed in solution or soluble. Moreover, the carbohydrate fibers of cellulose, lignin and starches are virtually insoluble in water, as are the earth particles and metallic oxide ash components, with only salts and sugars being actually soluble. Therefore, using the enlarged definition of soluble as including both truly soluble matter and fine dispersions and suspensions, the following table indicates the contents of the 2,000 pound sample of dry manure:

|  | Soluble and Suspended Matter | Insoluble Particulate |
|---|---|---|
| Crude protein | 320 | — |
| Fats | 80 | — |
| Sugars | 40 | — |
| Carbohydrates, etc. | 40 | 840 |
| Salts | 100 | — |
| Ash | 20 | 560 |
|  | 600 pounds | 1,400 pounds |

On review of the above table, it is clear that a 2,000 pound sample of dry manure, on being milled to a uniform size and mixed with 24,000 pounds of water, i.e., a 12:1 ratio, includes approximately 30 percent soluble matter according to the expanded definition, while the remaining 70 percent is in insoluble particulate form. Or, expressed slightly differently, the total solids in the water-manure slurry are approximately one part in twelve or about 8.3 percent solids, of which 2.5 percent are in solution and 5.8 percent remain as solid fibers, suspended ash and the like.

Certain prior art processes have attempted recovery by simple screening of a water-manure slurry, in which case it has been found that a wet mass of 87 percent liquid with 13 percent solid content is obtained. Analysis shows that only approximately 13 to 15 percent of the proteins and fats are obtained in this way from the slurry, along with 45 percent of the fibers and ash components. When this entire wet mass was pressed down to a more usable condition of approximately 60 percent liquid and 40 percent solid, only 8 percent of the protein and fat remained in the relatively dry solids, that is, in the fibers. Accordingly, it must be concluded from this that over 92 percent of the valuable proteins and fats and 65 percent of the carbohydrates were left in the liquid portion, and were, therefore, lost in this process. Moreover, on flocculation agents being added prior to separation of this solids from the liquid portion, the screens used in the process quickly become clogged, losing their effectiveness, or, if to avoid this, more dilution water were added, this only increased the liquid-solid problem.

In accordance with the present invention, it has been found that a cattle excreta waste-brine solution slurry, with or without the addition of flocculation agents, is virtually unfilterable in the usual sense of the word, and that only accelerated gravity force equipment such as a centrifuge provides an economically feasible process for separation of the gross fibers and the liquid portion. Moreover, as will be more particularly shown in the following example, I have found that only by centrifuging in a perforate basket lined with 10–40 mesh cloth at 400–800 times gravity, can a practical and economically feasible separation of the gross fibers from the liquid portion of a manure-water slurry be obtained prior to recovery of the proteins and fats from the liquid portion. Still further, whereas in the past by the simple screening and pressing techniques, recovery has been in the range of 8 to 10 percent, by the process of this invention, recovery has been increased to over 90 percent with the use of fairly inexpensive and simple processing techniques.

EXAMPLE

A 2,000 pound sample of dry manure approximately two to three months old, was shredded and then mixed in a tank 10 with 24,000 pounds of recycle brine first processed through the system in a manner that will be referenced in detail later. The slurry was desanded to remove ash components and larger inorganic particulate matter as described in the copending patent application. The 24,000 pounds of recycle brine on an average carried about 1,000 pounds of dissolved salts. The amount of ash components and particulate matter removed by the desanding process was in the range of 310 to 320 pounds of ash with some 80 pounds of valuable kernels of grain and the like which can be directly added to the final recycled nutrient material. Accordingly, prior to subsequent treatment in accordance with this invention, 390 to 400 pounds of solid materials were removed from the initial 2,000 pound dry manure sample. Analysis of the remainder, i.e., after desanding, showed the following composition:

|  | Soluble and Suspended Matter | Insoluble Particulate |
|---|---|---|
| Crude protein | 320 | — |
| Fats | 80 | — |
| Sugars | 40 | — |
| Fibers or carbohydrates | 40 | 775 |
| Salts | 100 | — |
| Ash | 20 | 225 |
| Subtotal solids | 600 | 1,000 |
| Carrier water or brine | 1,000 | 23,000 |
| Total slurry | 1,600 pounds | 24,000 pounds |
| Grand Total | 25,600 pounds | |

From the above table it is clear that approximately 2,600 pounds of solids in 23,000 pounds of water exist after desanding (of which 1,000 pounds are recycled soluble salts), with a total by weight of approximately 10 percent solids including the salts in the recycled brine. Moreover, 1,600 pounds or 6.1 percent are either in true solution or in fine suspension with the balance being discrete particle non-suspended solids. This slurry was maintained at ambient temperature throughout the remaining steps which ranged from 60° to 80°F.

10 to 50 pounds of ferric chloride was then added to the slurry and, after thorough mixing, 20 to 50 pounds of lime (CaO) were added, followed by further stirring and agitation to dissolve the materials. The pH ranged from 6.3 to 6.8 before flocculation and from 5.2 to 6.5 thereafter.

Next, the treated slurry, along with flocculated matter, was delivered to a 40 × 30 inch Tolhurst centrifugal basket separator 12 which was lined with a 10–40 mesh cloth, and spun in the range of 400–800 times gravity. A relatively thick, cake-like layer of the fibers formed in the basket during centrifugation, which also served to collect part of the suspended materials from the liquid portion by entrapping it within the cake-like layer. Upon analysis of the mother brine solution obtained after separation in 12, only 1 to 2 percent of the suspended inorganic ash solids and the balance of 4 to 5 percent salts, proteins, fats and the like were found to remain in the mother brine.

The fibers or solid cake portion were further spun until about 40 to 42 percent solid content was obtained. Approximately 2,800 pounds of wash water was used for removal of salt.

The mother brine solution from the centrifugal separator 12 is treated next with one part gaseous ozone for approximately each 200,000 parts of the mother liquor. Optionally, all or part of the flocculant agents (e.g., $FeCl_3$, lime or sulfuric acid) may also be added at this time. In either case, 95 percent of Coliform and other pathogenic microorganisms were killed and a substantial improvement in odor was obtained. The so-treated liquid was then transferred to a gravity concentration tank or thickener vessel 14 (20 feet in diameter) which on settling provided 8-12 percent solids with a clear brine supernate having a 3-4 percent salt content. With the supernate salt content in the range of 2-6 percent, the flocculation agents produced a rapid and sharp gravity separation of the soluble proteins, fats and carbohydrates, with an accompanying 70-72 percent gravity settling and compaction effected within 2-4 hours.

Two especially beneficial results are obtained through the use of a gravity concentration tank. First of all, a salt bleed-off stream with very small organic content (and therefore no offensive gases) is obtained which may be merely transferred as is to a salt flat or an evaporator for disposal. Although only a small organic content exists in the brine stream at this time, it is important that even this be removed so that the final bleed brine be completely sterile. This is accomplished by treating the stream with ozone in the ratio of one part ozone for each 100,000 parts brine stream. The solids underflow from the tank are a significant additional source of nutrients which in the prior art processes have been lost.

The thick, damp underflow from the thickener tank, weighing approximately 8,000 pounds and including an 8-10 percent solid content or 800 pounds, were transferred to a 40 inch diameter solid bowl centrifugal device 16 and operated in the 800-1,200 gravity range. Although various other separation techniques were tried for this stage of nutrient recovery, only the solid bowl centrifuge operating in the prescribed range was found to be effective.

The 1,650 pounds of solid gel obtained from the centrifuge 16, amounting to approximately 500 pounds of dry solids at 33 percent protein, were added to the solid output of the perforate basket 12. The 6,350 pounds of centrate was mixed with the clear overflow from the gravity concentration tank for use as reflux brine with which the manure slurry is made. To maintain a liquid balance throughout the system when using recycle brine, it has been found that approximately 2,250 pounds of fresh make-up water is needed to provide the 24,000 pounds of recycle brine needed for the ensuing 2,000 pound sample of dry manure.

The livestock food output from both the solid and the liquid portions may be either recycled separately or mixed together as described above. In either case, the gel from the centrifuge 16 is found to include about 33 percent protein, whereas the fibers and other solids obtained directly from the perforate basket 12 have a 10-12 percent protein content.

As a final step in the process, it is usually necessary to accomplish some dehydration, with the requirements for this depending upon the individual situation. For example, organic substances, such as the livestock food obtained in the subject process, will support bacterial action if moisture levels are allowed to remain at 13 percent or higher for a significant period of time. In any event, it has been found that if the recycled nutrients are to be exported, shipped or stored for an extended period of time at, say, 50 percent moisture levels, it is essential to sterilize the product to prevent deterioration from bacterial action. Although thermal sterilization at 250°F for 20-30 minutes is excellent, it is also very costly and wasteful of heat energy. Instead, it has been found more economically feasible to introduce small amounts of formaldehyde, or chlorine, or ozone into the product, which kills the bacteria while leaving the product acceptable to the animals. For example, 200 grams of formaldehyde added to the product immediately prior to placing in a drying kiln 18 effectively kills all residual Salmonella, Coliform and other toxic bacteria, and does not give an observable taste, odor or other adverse characteristic to the recycled food. Alternatively, formaldehyde may be added as a precipitant or flocculant to the settling tank 14 and this will also perform the bactericidal function at the same time, only in this case, it will be necessary then to process and handle the livestock food obtained from the solid portion via the perforate basket 12 in a separate manner.

It is important to note that in the practice of this invention, protein precipitants are added at two different points in the process, namely, before the first separation at 12 and subsequent to the first separation at the gravity concentration tank 14. In this manner, optimum practical use of the centrifugal separator 12 is obtained. That is, if the total protein precipitation were attempted in one step, the separator 12 would frequently become clogged. However, by maintaining a lowered amount of precipitation at 12 a clogged condition is avoided, and the residual proteinaceous material is then removed farther downstream in the process as described.

I claim:

1. A process for recovering livestock food from cattle excreta waste which comprises the steps of, in the order stated:

mixing said excreta waste with a recycle brine solution in the ratio ranging from 12-14 to 1 of said brine solution to excreta waste to form a slurry including solid portions;

mechanically separating said brine solution and said solid portions of the slurry from ash components in the slurry;

flocculating a first solid coagulable constituent from said brine solution, utilizing a protein coagulant;

centrifuging said coagulable constituent from said brine solution in a range of 400 to 800 times gravity field;

treating the aforesaid brine solution with gaseous ozone and a protein coagulant;

settling the aforesaid brine solution to provide a second solid coagulable constituent;

centrifuging the second solid coagulable constituent in the range of 800 to 1200 times gravity field;

mixing the centrifuged second solid coagulable constituent with said first coagulable constituent, providing a damp livestock food;

adding a volatile sterilizing agent to the combined livestock food, and drying said livestock food; and removing a selected fraction of solution from aforesaid brine solution and adding an equivalent volume of water, providing a recycle brine solution.

2. A process for making a nutritious additive for cattle feed from shredded cattle excreta waste, which comprises:

mixing said shredded excreta waste with a recycle brine solution to form a slurry;

mechanically removing ash constituents;

flocculating a first coagulable constituent from said slurry, utilizing a protein coagulent;

centrifuging the slurry in the range of 400 to 800 times gravity field to separate the mother brine solution and the first coagulable solid portion thereof;

treating said separated mother brine solution with ozone gas and a protein coagulant;

gravity concentrating solids from the treated separated mother brine solution;

centrifuging the gravity concentrated solids in the range of 800–1200 times gravity field;

mixing the solids from said two centrifugings, to provide said nutritious additive;

sterilizing said nutritious additive with a sterilizing agent; and removing a selected fraction of solution from aforesaid mother brine solution and adding an equivalent volume of water, providing a recycle brine solution.

3. A process for recovering nutrients from cattle excreta waste which comprises the steps of: mixing said excreta waste with recycle brine solution to form a slurry;

mechanically removing ash components from the slurry;

mixing a quantity of $FeCl_3$ with said slurry, followed by mixing a quantity of $CaO$ therewith to flocculate coagulable constituents;

centrifuging said flocculated constituents to separate the liquid and solid portions, said centrifuging being carried out in the range of 400 to 800 times gravity field;

treating said separated liquid portion with ozone gas and adding further materials to flocculate coagulable constituents;

gravity concentrating said gasified and further flocculated liquid portion to produce a recycle brine solution and a damp solid portion;

centrifuging said damp solid portion in the range of 800–1200 times gravity field, the liquid obtained therefrom being added to said recycle brine solution and the solids added to the separated solids;

sterilizing and drying all said separated solids; and removing a selected fraction of solution from aforesaid brine solution and adding a corresponding volume of water, providing a recycle brine solution.

* * * * *